Figure 1:
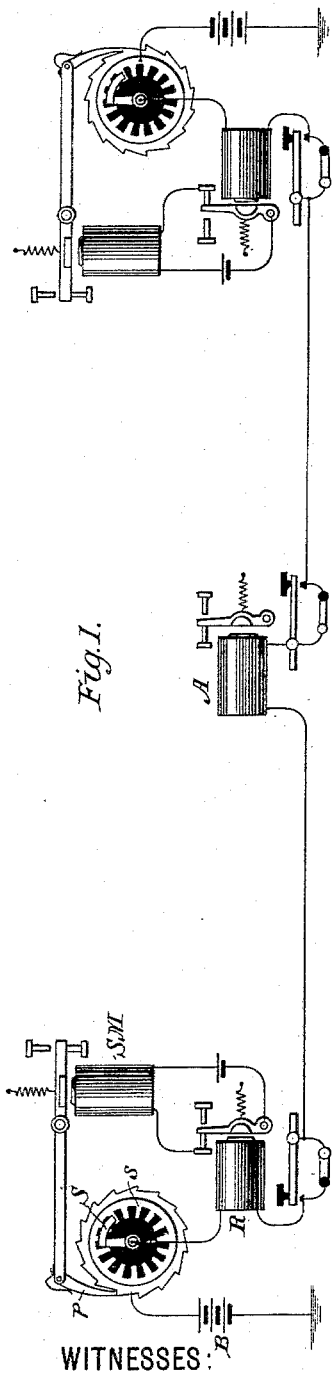

(No Model.)

P. B. DELANY.
TELEGRAPHY.

No. 401,334.  Patented Apr. 16, 1889.

WITNESSES:
Raymond F. Barnes.
Edward C. Davidson.

INVENTOR,
Patrick B. Delany
BY
Baldwin, Davidson & Wright
his ATTORNEYS.

UNITED STATES PATENT OFFICE.

PATRICK B. DELANY, OF NEW YORK, N. Y.

TELEGRAPHY.

SPECIFICATION forming part of Letters Patent No. 401,334, dated April 6, 1889.

Application filed November 10, 1888. Serial No. 290,444. (No model.)

*To all whom it may concern:*

Be it known that I, PATRICK B. DELANY, a citizen of the United States, residing in New York, State of New York, have invented certain new and useful Improvements in Telegraphy, of which the following is a specification.

My present invention relates to the operation of telegraph-lines having way-stations. Upon such lines, owing to defective insulation or atmospheric conditions, the leakage of current is often so great that relays at way-stations fail to respond to makes and breaks of the circuit and require frequent adjustment. Under such conditions operators whose relays do not respond when the line is being used may break in upon the line and interrupt messages being sent over it.

In my patent, No. 389,062, dated September 4, 1888, I have shown a system of telegraphy in which a line is disconnected from the battery and grounded at each end after each transmission of an electrical impulse. In that patent there may be any desired number of way-stations, and the line may, if desired, also be grounded at such way-stations after the transmission of an impulse.

The primary object of the invention described in that patent was to clear the circuit of static disturbance or extra currents, and said invention was specially intended for use on cables or long lines where the static capacity or retardation is large.

A further object of the system described in said patent is to insure the operation of relays at way-stations, and in that system, after the opening of any transmitting-key in the line, there will be a moment during which the line is put to earth at both ends and all the intermediate relays will respond. The operators will therefore know that the line is in use and can keep their relays adjusted to respond to the currents passing over the line and improper breaking in upon and monopolizations of the circuit need not occur.

I have now made the discovery that by opening the line at the point where the separable contacts are located after each impulse of current, and for a moment leaving the end or ends of the line in the air, or unconnected with earth, practically better results may be obtained on way-station lines than where the line is put to earth, as in my prior patent above mentioned, and certain objections sometimes incident to the grounding of the line—such, for instance, as the short-circuiting of the battery through the ground-contact—are avoided.

By preference I employ a battery at each end of the line and means at each end of the line for disconnecting it from the battery and opening it after the transmission of each impulse, or I may open the line at some point intermediate between the two terminals; but the latter arrangement would not be so desirable.

Figure 2:
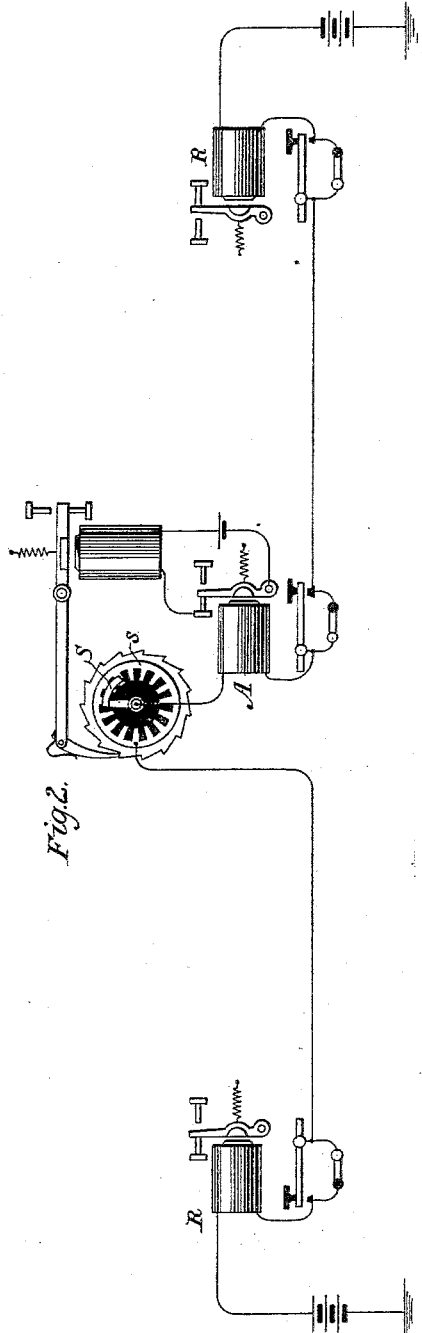

In the accompanying drawings, Figures 1 and 2 are diagram views illustrating modified arrangements.

In Fig. 1, at each terminal the line extends through the coil of a relay, R, to the spindle of a trailer, S, normally resting upon a contact or tooth of the plate $s$, through which it is connected with the battery B. The contacts or teeth on the plate are separated by insulating material. The circuit being normally closed, as indicated, the relay-armature is normally attracted, thus closing the circuit of the sounder-magnet SM, which holds its armature down. Each time that the key at any station is opened the sounder-armature is released, and in its retrograde movement a pawl, $p$, thereon acts upon a tooth of the ratchet-wheel on the spindle of the trailer, thus moving the trailer from one contact or tooth of the plate $s$ to the next tooth across the intervening insulation, thereby opening the line or disconnecting it from the battery and earth.

Any number of intermediate relays or way-stations may be located on the line, one such being shown, and whatever may be the leakage or statical conditions of the circuit the armatures will respond upon the opening of the circuit.

In Fig. 2 I have shown an ordinary arrangement with keys and relays at the terminal stations, and at an intermediate station the circuit passes through the relay A, trailer S, to the plate $s$, and to line again. The trailer normally rests upon a contact or tooth of the plate $s$, and when the circuit is opened it is moved, as above described, across intervening insulations to the adjoining tooth, thus briefly opening the line while the battery at the transmitting-stations is disconnected there-from. This arrangement, however, I do not consider as desirable a manner of operating, for the reason that it would only, in a measure, affect the relays at such way-stations as might be located between the distant end of the line and the point of opening the circuit. I prefer to work with a battery at each end of the line, as shown in the drawings. In Fig. 1 each terminal station is organized so as to be ready either for transmission or reception. Of course, if transmission from one end only is contemplated, no special circuit-opening devices are required at the transmitting-station, because the battery would be disconnected and the line opened when the key was raised.

It will be perceived that the opening of the line is dependent upon the action of the relays after the transmission of an impulse, and that signals or impulses of any desired duration or character may therefore be sent. Of course the operators at terminal stations have the responsibility of properly adjusting their relays and will be careful to adjust them accurately, and that being done the relays at the intermediate stations will invariably respond.

In explanation of the operation of this system it may be stated: In damp weather there is so much leakage of current to earth down the poles, or by contact of the wire with trees, or other causes of defective insulation, that it frequently happens that when the circuit is broken at one end of the line the partial ground-connection intervening between the first intermediate station and the distant end station will provide a path for the battery at the distant end of the line sufficient to render the said opening of the line ineffective for signaling at the first intermediate station, or at any or all of the intermediate stations, unless, perhaps, some of them may have the retractile springs of their relays at so high a tension that their relays will respond to the opening of the line. Under such conditions, arising either from weather effects or mechanical injury to a telegraph-line—such as the falling of one or more poles and the dragging of the wire to ground, so as to partly divide the circuit—it might be impossible for the first end station to communicate with one or more of the intermediate stations, the signals not being manifested on the instruments as adjusted, and unless the intermediate-station operators have the forethought and skill at times to adjust their instruments up to the highest limit, for the purpose of making sure that they are not being called in vain, messages or important train-orders must inevitably be delayed perhaps for hours, with possibility of causing loss of life and property.

Operators are not expected to keep their relays at the highest point of adjustment, as it would interfere seriously with the speed and ease of working, because of the drag or hesitation of the armature in coming forward when the signals or impulses are sent over the line, the tension on the spring almost balancing the attracting power of the relay-magnet. Under such conditions the local sounder-circuit would be but imperfectly closed and reading rendered very difficult. Therefore to render the working easy and smooth it is customary to adjust the relay-armature springs so that the attracting-power of the relay-magnets will be so much greater than the retractile force of the springs that the armature will respond quickly and unhesitatingly to the most rapid manipulations. Thus it is that the operators, without exception, always prefer to work on a low adjustment, and the lower the adjustment the more oblivious they are to the efforts of a distant station to call them over a line partially grounded. Not only are they unaware that they are wanted, but they may be calling the very station that is calling them and occupying the line by interruptions amounting frequently to an entire suspension of business. With my apparatus if, when this partial grounding of the line occurs, as above mentioned, and the line is opened at one end, and the operator at the other or distant end of the line, knowing that he is responsible for the general operations of the wire, sees to it that his relay is adjusted so as to get the signals of the distant office over the partial ground, then by the operation of his relay-armature my line-adjusting instrument is operated and the battery disconnected for an instant each time that the operator at the first end station opens his key, or during the time that the trailing-finger is passing over a disconnected segment. The effect of this momentary break is to leave the line free of any battery-connection for a moment, and it must necessarily follow that the unadjusted intermediate instruments must respond if there is any tension whatever on their adjusting-springs. If their instruments but give a short click corresponding to the passage of the trailing-finger over the segment, it will be sufficient to show them that the line is in use and that they are out of adjustment. Then by drawing their relay-armature springs tighter they will receive all the signals. The same principle of operation holds good regardless of the point at which the line is operated. A key opened at a station in the middle of the line will disconnect the battery at both ends of the line for a moment and the circuit will be broken at three points, rendering it impossible for any station on either side to be unaware of what is going on.

On wet days, or under such conditions of partial grounding, the static discharge of the line can have no effect whatever on the instruments, since the static is all discharged to earth all along the line through the defective insulation.

The placing of one of the adjusters in the middle of a line or at some point between its terminals also has a beneficial effect on the working of the line in addition to its adjusting effect on other instruments in the circuit.

To a considerable extent it repeats the signals going through; thus, if Washington be sending a message to New York, one of these instruments at Philadelphia would break the line there for a moment each time that it was broken at Washington, so that with an evenly-distributed partial ground between Washington and New York, making a considerable path to earth for the New York battery, notwithstanding the Washington key was opened, and requiring a high adjustment of the New York instrument, about one-half of the partial ground would be overcome by the opening of the line at Philadelphia, and the signals from Washington would be received in New York much clearer and on a lower adjustment of the New York instrument. The fact that the Philadelphia instrument would only break the circuit for an instant, and that the partial ground would be on the line again throughout the entire distance, would not, as might be supposed, neutralize the effect of the momentary opening of the line, for it is well understood by those experienced in such matters that when the armature of a relay is allowed to go to its back post, it being some distance away from the magnet, a much stronger current is required to attract it forward again than is necessary to hold it to its front stop after it once gets there. Therefore the momentary opening at Philadelphia allows the armature of the New York relay to be pulled back; but the re-establishing of the partial ground between Philadelphia and Washington immediately after will not of itself be sufficient to cause the attraction of the armature to the magnet again. The battery must be applied at Washington.

I claim as my invention—

1. The combination, substantially as set forth, of a line, a battery at each end thereof, with which the line is normally connected, transmitting and receiving devices at each end of the line, and line-opening devices at each end of the line, said devices consisting of separable contacts included in the line, one of which is disconnected or insulated from the other and from earth when the contacts are separated, and contact-separating devices controlled by the relay, which momentarily separate said contacts and leave the line open or disconnected from earth and battery for a brief period after each interruption of the main circuit.

2. The combination, substantially as set forth, of a line, a battery, transmitting devices at one end thereof, a receiving-relay in the line at a point removed from the transmitting-station, line-opening devices at said relay, said devices consisting of separable contacts in the line-circuit, which while separated leave the line broken or open, and contact-separating devices controlled by said relay, that briefly separate the contacts, and thereby open the line upon the movement of the relay when the circuit is opened at the transmitter.

3. The combination, substantially as set forth, of a line, terminal and way stations connected in the line, a battery, transmitting devices at one end thereof, a receiving-relay in the line at a point removed from the transmitting-station, line-opening devices at said relay, said devices consisting of separable contacts in the line-circuit, which while separated leave the line broken or open, and contact-separating devices controlled by said relay, that briefly separate the contacts, and thereby open the line upon the movement of the relay when the circuit is opened at the transmitter.

4. The combination, substantially as set forth, with a line, a battery at each end thereof, with which the line is normally connected, and electro-magnetic-receiving devices and transmitting-keys connected directly in the line, of a series of contacts connected with the battery at each terminal station, said contacts being separated by intervening insulated spaces, a trailer or contact-maker actuated by the electro-magnetic receiving devices to pass from one battery-contact across the intervening space, thereby opening the line to the next battery-contact each time the circuit is opened at a transmitter, and electro-magnetic receiving devices connected in the line at intermediate or way stations.

5. The combination, substantially as set forth, of a line having terminal and way or intermediate stations, a battery with which the line is normallly connected, transmitting and receiving devices at each end of the line, and line-opening devices at each end of the line, said devices consisting of separable contacts included in the line, one of which is disconnected or insulated from the other and from earth when the contacts are separated, and contact-separating devices controlled by the relay, which momentarily separate said contacts and leave the line open or disconnected from earth and battery for a brief period after each interruption of the circuit.

6. The combination, substantially as set forth, with a relay, of a rotating trailer or contact-maker, a series of segments or contacts over which the trailer rotates, the said segments being separated by intervening insulation, trailer-rotating devices controlled by the relay, an electric circuit including the relay-coil, the rotating contact, and the circle of segments traversed thereby, and a source of electric energy, whereby, upon the movement of the relay-armature, the rotating contact is moved from one segment across the intervening insulation to the next segment and the circuit thereby momentarily opened.

In testimony whereof I have hereunto subscribed my name.

PATRICK B. DELANY.

Witnesses:
EDWD. A. CALAHAN,
CHAS. C. ZUKSCHWERDT.